(12) United States Patent
Hellström et al.

(10) Patent No.: US 7,392,946 B2
(45) Date of Patent: Jul. 1, 2008

(54) MOBILE RADIO TERMINAL HAVING A MULTIPLE FORM FACTOR MEMORY CARD READER

(75) Inventors: Sven A. Hellström, Lund (SE); Zoltan Cslk, Arlöv (SE); Nils C. Axelsson, Kristianstad (SE); Per D. Gredinger, Malmö (SE); Lars M. Nilsson, Eslöv (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 11/423,534

(22) Filed: Jun. 12, 2006

(65) Prior Publication Data

US 2007/0284444 A1 Dec. 13, 2007

(51) Int. Cl.
*G06L 7/06* (2006.01)
(52) U.S. Cl. ...................................................... 235/441
(58) Field of Classification Search ......... 235/439–441, 235/444, 448, 451, 483; 439/700; 455/558
See application file for complete search history.

(56) References Cited

U.S. PATENT DOCUMENTS

| | | | | |
|---|---|---|---|---|
| 5,198,645 | A * | 3/1993 | Martin et al. ................. | 235/441 |
| 5,506,510 | A * | 4/1996 | Blumenau ................... | 324/754 |
| 5,641,315 | A | 6/1997 | Swart et al. | |
| 5,831,256 | A * | 11/1998 | De Larminat et al. ........ | 235/486 |
| 6,396,293 | B1 | 5/2002 | Vinther et al. | |
| 6,663,007 | B1 * | 12/2003 | Sun et al. .................... | 235/487 |
| 6,666,690 | B2 | 12/2003 | Ishizuka et al. | |
| 6,716,043 | B2 | 4/2004 | Ishizuka | |
| 6,747,547 | B2 * | 6/2004 | Benson ....................... | 340/10.4 |
| 6,786,415 | B2 * | 9/2004 | Yiu ............................. | 235/486 |
| 6,859,673 | B2 * | 2/2005 | Steffen ........................ | 700/90 |
| 6,991,159 | B2 * | 1/2006 | Zenou ......................... | 235/383 |
| 7,048,187 | B1 * | 5/2006 | Yu .............................. | 235/451 |
| 7,296,741 | B1 * | 11/2007 | Kao et al. ..................... | 235/441 |

FOREIGN PATENT DOCUMENTS

| | | |
|---|---|---|
| FR | 2687238 | 8/1993 |
| WO | 2005027021 | 3/2005 |

OTHER PUBLICATIONS

Fujipoly, Zebra Elastomeric Connectors, 4 pages, downloaded from Internet at http://www.pujipoly.com/products/genProduct.asp?ProductName=FG-S_AND_GF-S_FINE&ProductLine... on Jun. 25, 2006.
Product Literature from Everett Charles Technologies, 5 pages, 2003.
International Search Report for corresponding International Application No. PCT/IB2006/003515.

* cited by examiner

*Primary Examiner*—Michael G. Lee
*Assistant Examiner*—Carol Hesse
(74) *Attorney, Agent, or Firm*—Renner, Otto, Boisselle & Sklar, LLP

(57) ABSTRACT

Disclosed is a media device (e.g., a memory card) reader configured to physically accept and electronically interface with plural form factor media devices. The media device reader may be part of an electronic equipment, such as a mobile telephone. The media device reader may include a connector assembly having a pattern of contacts. A controller may be used to determine a relationship of connector assembly contacts to contacts of a media device that is inserted into the media device reader.

20 Claims, 3 Drawing Sheets

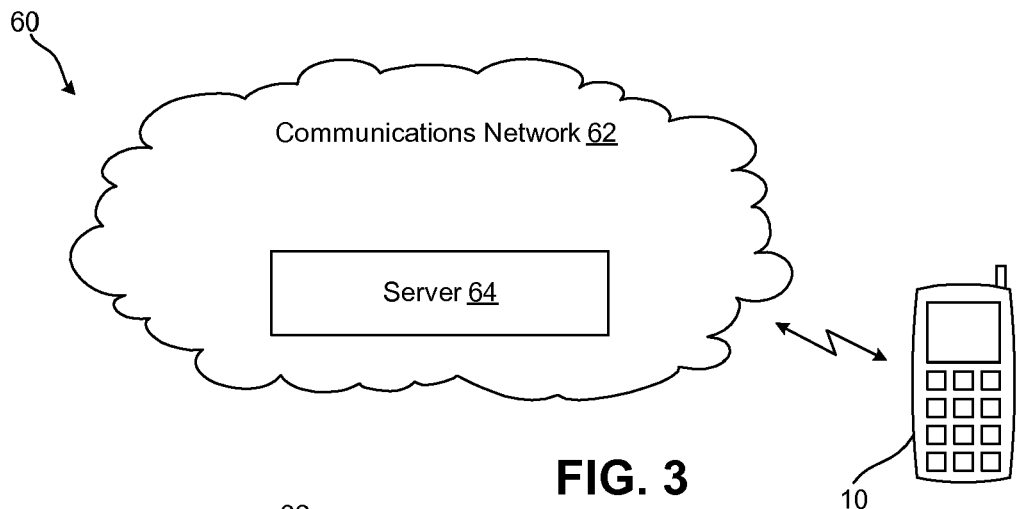
FIG. 3
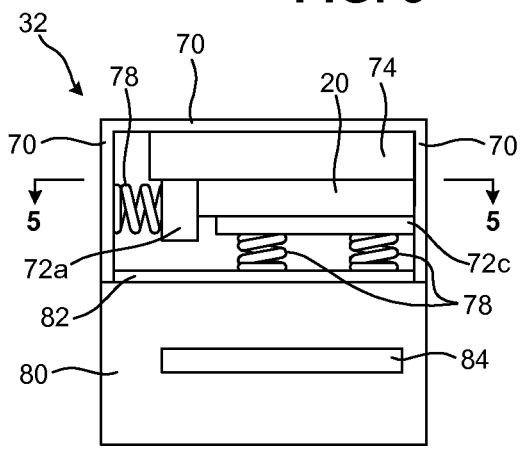
FIG. 4
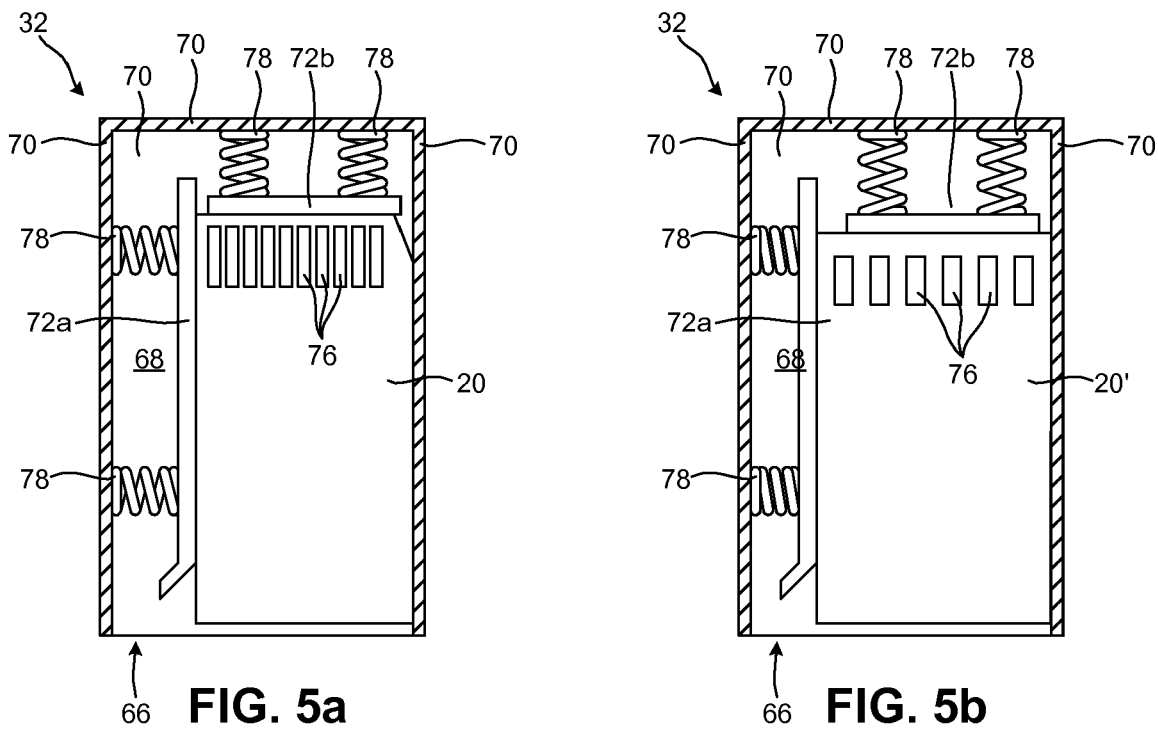
FIG. 5a  FIG. 5b

MOBILE RADIO TERMINAL HAVING A MULTIPLE FORM FACTOR MEMORY CARD READER

TECHNICAL FIELD OF THE INVENTION

The present invention relates generally to electronic equipment, such as electronic equipment for engaging in voice communications. More particularly, the invention relates to a mobile radio terminal having a multiple form factor media device reader.

DESCRIPTION OF THE RELATED ART

Mobile and/or wireless electronic devices are becoming increasingly popular. For example, mobile telephones and portable media players are now in wide-spread use. In addition, the features associated with certain types of electronic devices have become increasingly diverse. To name a few examples, many electronic devices have cameras, text messaging capability, Internet browsing functionality, electronic mail capability, video playback capability, audio playback capability, image display capability and hands-free headset interfaces.

As the features and functions of electronic devices increase, there is a corresponding need to store executable logic and data with a memory associated with the electronic devices. For example, software programs and data may be stored on the memory. Stored data may include audio files, image files, video files, text files and so forth.

Removable memory media for use with electronic devices has been popular. The removable media allows the user to upgrade the memory storage capacity of the electronic device. Data may also be transferred from one device to another by removing the media that stores the data and inserting the media into a reader of the target device.

As will be appreciated, removable media comes in many form factors. For example, memory card form factors include compact flash (CF), secure digital (SD), XD, and so forth. Conventional memory cards have a housing that is cuboid in nature and that generally defines a rectangular parallelpiped. Electrical contacts are often arranged on a surface of the housing. Corresponding contacts of the reader may engage the contacts for operation of the memory card. Other memory cards may have openings into which pin contacts of the reader extend to engage corresponding contacts of the memory card.

Unfortunately, for proper interfacing of a memory card to an electronic device, the electronic device must have a memory card reader compatible with both the physical arrangement of the memory card and the operative arrangement of the memory card's contacts. Therefore, most electrical devices will only accept one memory card form factor. It is noted that some readers may accept more than one type of memory card or device, but when those devices have the same physical housing arrangement and/or electrical interface, the form factor of those devices will be considered to be the same for purposes of the description herein. For example, CF cards are based on flash memory technology and CF form factor Microdrives are based on miniature hard drive technology, but each are considered to have the same form factor since each have the same physical housing arrangement and electrical interface. As a result, electrical devices that accept plural form factors have multiple reader interfaces where there is a one to one correspondence between the reader interface and memory device form factor.

SUMMARY

According to one aspect of the invention, an electronic equipment includes a media device reader configured to physically accept and electronically interface with plural form factor media devices, the media device reader having a connector assembly having a pattern of contacts; and a controller that determines a relationship of connector assembly contacts to contacts of a media device that is inserted into the media device reader.

According to another aspect, the media devices are memory cards.

According to another aspect, the electronic equipment is a mobile radio terminal.

According to another aspect, the mobile radio terminal is a mobile telephone.

According to another aspect, the media device reader includes a positionable wall that moves between a first position to accept a media device having a first form factor and a second position to accept a media device having a second form factor.

According to another aspect, the media device reader includes a multiplexor that is controlled by the controller to operatively arrange the connector assembly contacts to interface with corresponding contacts of the inserted media device.

According to another aspect, the controller pairs the connector assembly contacts and probes for continuity between the contacts of the pairs, and where continuity, if present, is established by a contact of the inserted media device.

According to another aspect, the controller compares the location of contact pairs that have continuity with known media device contact patterns to determine the type of inserted media device.

According to another aspect, the media device reader includes a multiplexor that is controlled by the controller to establish the pairs of connector assembly contacts.

According to another aspect, the connector assembly contacts are arranged in a matrix.

According to another aspect, the connector assembly contacts are arranged in offset rows.

According to another aspect, the connector assembly includes an elastomeric connector strip having conductors embedded therein, the conductors forming the contact assembly contacts.

According to another aspect, the connector assembly contacts are changeable height pins.

According to another aspect, the media device is removable by a user of the electronic equipment.

According to another aspect, the controller adjusts media device interface logic to interface with the inserted media device in accordance with the determined relationship of connector assembly contacts to contacts of the inserted media device.

According to another aspect of the invention, a media device reader for an electronic equipment includes at least one positionable wall that moves between a first position to accept a media device having a first form factor and a second position to accept a media device having a second form factor; and a connector assembly having a pattern of contacts for establishing electrical connection with plural electrical contacts of an inserted media device.

According to another aspect, the inserted media device is a memory card.

According to another aspect, the wall urges the inserted media device toward a desired location within the media device reader.

According to another aspect, the wall is biased with a spring.

According to another aspect, the media device reader further includes a controller that determines a relationship of connector assembly contacts to contacts of the inserted media device.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIG. 3 is a schematic diagram of a communications system in which the mobile telephone of FIG. 1 may operate;

FIG. 4 is an end view of a card reader in accordance with an embodiment of the present invention where a card of a first exemplary form factor is inserted therein;

FIG. 5a is a cross section view of the card reader taken along the line 5-5 in FIG. 4 where the card of the first exemplary form factor is inserted therein;

FIG. 5b is a cross section view of the card reader taken along the line 5-5 in FIG. 4, but where a card of a second exemplary form factor is inserted therein;

DETAILED DESCRIPTION OF EMBODIMENTS

Figure 1:
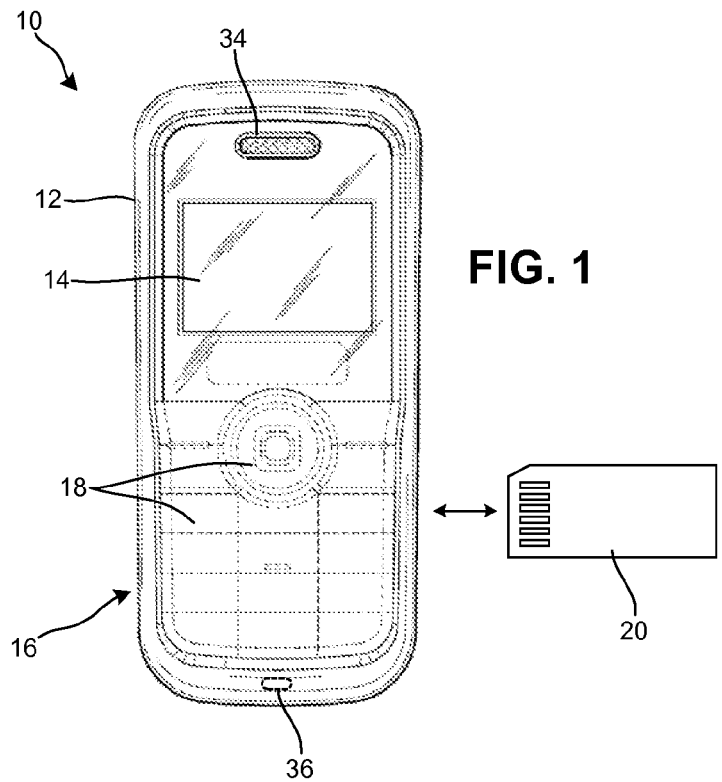
FIG. 1 is a schematic view of a mobile telephone as an exemplary electronic equipment in accordance with an embodiment of the present invention.

The present invention will now be described with reference to the drawings, wherein like reference numerals are used to refer to like elements throughout. It will be appreciated that the figures are not necessarily to scale.

The term "electronic equipment" includes portable radio communication equipment. The term "portable radio communication equipment," which herein after is referred to as a "mobile radio terminal," includes all equipment such as mobile telephones, pagers, communicators, i.e., electronic organizers, personal digital assistants (PDAs), smartphones, portable communication apparatus or the like.

In the present application, the invention is described primarily in the context of a mobile telephone. However, it will be appreciated that the invention is not intended to be limited to a mobile telephone and can be any type of electronic equipment. Other exemplary electronic equipment may include, but are not limited to, portable media players, media jukeboxes, digital cameras and so on. Electronic equipment, as used herein, may or may not have a radio transceiver.

Referring initially to FIG. 1, an electronic equipment 10 is shown in accordance with the present invention. The electronic equipment includes a multiple form factor card reader and a card analysis function. The card reader is configured to accept multiple card form factors using the same physical card retainment space and electrical connector assembly. The card analysis function is configured to detect the type of card inserted into the reader and to activate a card interface logic for operatively interfacing with the inserted card. It will be appreciated that the card analysis function and/or the card interface logic may be embodied as executable code that may be resident in and executed by the electronic equipment 10.

The electronic equipment in the illustrated embodiments is a mobile telephone and will be referred to as the mobile telephone 10. The mobile telephone 10 is shown as having a "brick" or "block" form factor housing 12, but it will be appreciated that other type housings, such as a clamshell housing or a slide-type housing, may be utilized.

The mobile telephone 10 includes a display 14 and keypad 16. As is conventional, the display 14 displays information to a user such as operating state, time, telephone numbers, contact information, various navigational menus, etc., which enable the user to utilize the various feature of the mobile telephone 10. The display 14 may also be used to visually display content received by the mobile telephone 10 and/or retrieved from a memory (described below) of the mobile telephone 10.

Similarly, the keypad 16 may be conventional in that it provides for a variety of user input operations. For example, the keypad 16 typically includes alphanumeric keys 18 for allowing entry of alphanumeric information such as telephone numbers, phone lists, contact information, notes, etc. In addition, the keypad 16 typically includes special function keys such as a "call send" key for initiating or answering a call, and a "call end" key for ending or "hanging up" a call. Special function keys may also include menu navigation keys, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 may accept and electronically interface with a removable media device, also referred to herein as a card 20 or as a media unit. As used herein, the terms "media device," "media unit" and "card" refer to any removable electronic device that has circuitry for implementing a given function or functions. Thus, the term card includes removable memory devices, logic cards, and so forth. Exemplary memory devices that may be embodied by the card 20 include flash memory devices and miniature hard drives, such as a compact flash (CF) card, a secure digital (SD) card, a mini SD card, a micro SD card, an XD card, a Microdrive (e.g., miniature hard drive), a smart media card and a memory stick card. Cards currently marketed as "memory sticks" include the memory stick Duo Pro, the memory stick Select, and the memory stick Micro. A version of the memory stick Micro sold by Sony Corporation is referred to as a Sony M2 card. Other exemplary cards include subscriber identity module (SIM) cards and vCards. Cards may include a game module. Cards may include a controller, processor or other logic assembly, as well as support circuitry for the primary functions of the card.

The mobile telephone 10 further includes conventional call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc.

Figure 2:
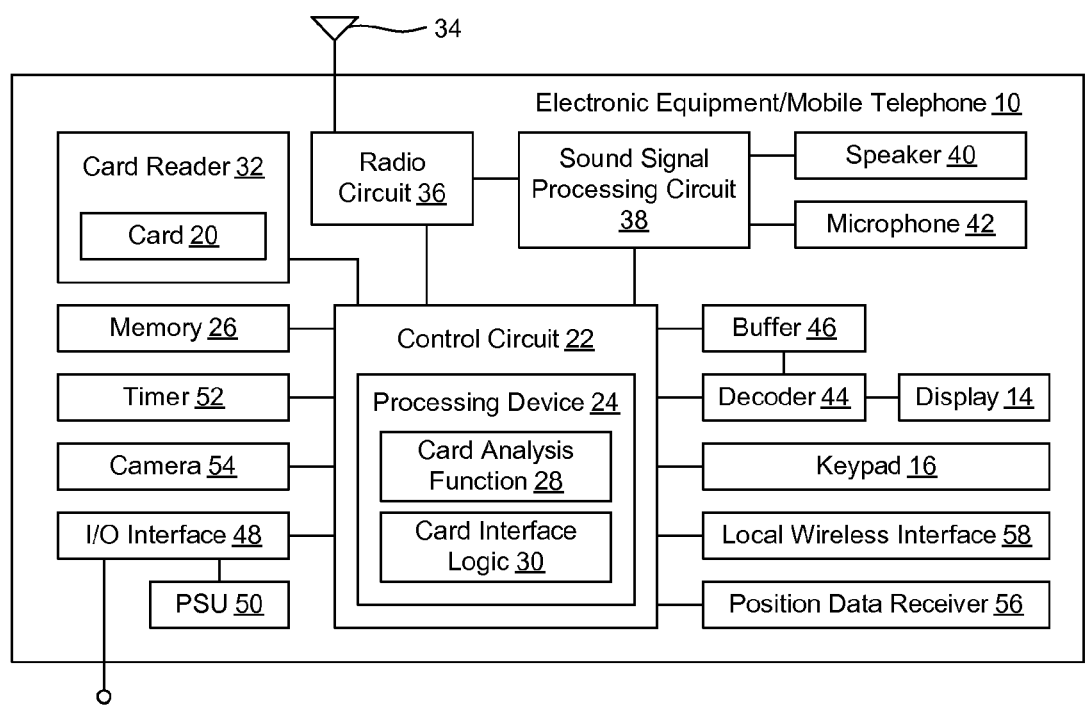
FIG. 2 is a schematic block diagram of the relevant portions of the mobile telephone of FIG. 1 in accordance with an embodiment of the present invention.

FIG. 2 represents a functional block diagram of the mobile telephone 10. For the sake of brevity, generally conventional features of the mobile telephone 10 will not be described in great detail herein. The mobile telephone 10 includes a primary control circuit 22 that is configured to carry out overall control of the functions and operations of the mobile telephone 10. The control circuit 22 may include a processing device 24, such as a CPU, microcontroller or microprocessor. The processing device 24 executes code stored in a memory (not shown) within the control circuit 22 and/or in a separate memory in order to carry out conventional operation of the mobile telephone 10. Thus, the mobile telephone 10 may include an integral memory 26 (e.g., a memory that is not configured to be readily removable, such as a memory that is soldered to a main circuit board of the mobile telephone 10 or otherwise fully contained within the housing 12). The memory 26 may be, for example, one or more of a buffer, a flash memory, a hard drive, a volatile memory, a non-volatile memory or other suitable device. Instead of or in addition to the integral memory 26, the card 20 may serve as a memory for the mobile telephone 10.

In addition to executing logic that carries out conventional operation of the mobile telephone 10, the processing device 24 executes code in order to perform a card analysis function 28 and card interface logic 30. The card analysis function 28 and the card interface logic 30 will be described below in greater detail. In other embodiments, one or both of the card analysis function 28 and the card interface logic 30 are carried out by a component other than the control circuit 22. For instance, these functions may be carried out by a card reader 32 configured to accept the card 20. Accordingly, the card reader 32 may include a controller for carrying out the card analysis function 28 and/or the card interface logic 30.

It will be apparent to a person having ordinary skill in the art of computer programming, and specifically in applications programming for mobile telephones or other electronic devices, how to program a mobile telephone 10 to operate and carry out the functions described herein. Accordingly, details as to the specific programming code have been left out for the sake of brevity. Also, while the card analysis function 28 and/or card interface logic 30 may be executed by the processing device 26 in accordance with one embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 34 coupled to a radio circuit 36. The radio circuit 36 includes a radio frequency transmitter and receiver for transmitting and receiving signals via the antenna 34 as is conventional. The radio circuit 36 may be configured to operate in a mobile communications system, as well as to receive audiovisual content. For example, the receiver may be an IP datacast compatible receiver compatible with a hybrid network structure providing mobile communications and digital broadcast services, such as DVB-H mobile television and/or mobile radio. Other receivers for interaction with a mobile radio network or broadcasting network are possible and include, for example, GSM, CDMA, WCDMA, MBMS, WiFi, WiMax, DVB-H, ISDB-T, etc.

The mobile telephone 10 further includes a sound signal processing circuit 38 for processing audio signals transmitted by/received from the radio circuit 36. Coupled to the sound processing circuit 38 are a speaker 40 and a microphone 42 that enable a user to listen and speak via the mobile telephone 10 as is conventional. The radio circuit 36 and sound processing circuit 38 are each coupled to the control circuit 22 so as to carry out overall operation. Audio data may be passed from the control circuit 22 to the sound signal processing circuit 38 for playback to the user. The audio data may include, for example, audio data from an audio file stored by the memory 18 or card 20, and retrieved by the control circuit 22. The sound processing circuit 38 may include any appropriate buffers, decoders, amplifiers and so forth.

The mobile telephone 10 also includes the aforementioned display 14 and keypad 16 coupled to the control circuit 22. The display 14 may be coupled to the control circuit 22 by a video decoder 44 that converts video data to a video signal used to drive the display 14. The video data may be generated by the control circuit 22, retrieved from a video file that is stored by the memory 18 or card 20, derived from an incoming video data stream received by the radio circuit 36 or obtained by any other suitable method. Prior to being fed to the decoder 44, the video data may be buffered in a buffer 46.

The mobile telephone 10 may further include one or more I/O interface(s) 48. The I/O interface(s) 48 may be in the form of typical mobile telephone I/O interfaces and may include one or more electrical connectors. As is typical, the I/O interface(s) 48 may be used to couple the mobile telephone 10 to a battery charger to charge a battery of a power supply unit (PSU) 50 within the mobile telephone 10. In addition, or in the alternative, the I/O interface(s) 48 may serve to connect the mobile telephone 10 to a wired personal hands-free adaptor (not shown), such as a headset (sometimes referred to as an earset) to audibly output sound signals output by the sound processing circuit 36 to the user. Further, the I/O interface(s) 48 may serve to connect the mobile telephone 10 to a personal computer or other device via a data cable. The mobile telephone 10 may receive operating power via the I/O interface(s) 42 when connected to a vehicle power adapter or an electricity outlet power adapter.

The mobile telephone 10 may also include a timer 52 for carrying out timing functions. Such functions may include timing the durations of calls, generating the content of time and date stamps, etc. The mobile telephone 10 may include a camera 54 for taking digital pictures and/or movies. Image and/or video files corresponding to the pictures and/or movies may be stored in the memory 18. The mobile telephone 10 also may include a position data receiver 56, such as a global positioning system (GPS) receiver, Galileo satellite system receiver or the like. The mobile telephone 10 also may include a local wireless interface 58, such as an infrared transceiver and/or an RF adaptor (e.g., a Bluetooth adapter), for establishing communication with an accessory, a hands-free adaptor (e.g., a headset that may audibly output sounds corresponding to audio data transferred from the mobile telephone 10 to the adapter), another mobile radio terminal, a computer or another device.

The mobile telephone 10 may be configured to transmit, receive and process data, such as text messages (e.g., a short message service (SMS) formatted message), electronic mail messages, multimedia messages (e.g., a multimedia messaging service (MMS) formatted message), image files, video files, audio files, ring tones, streaming audio, streaming video, data feeds (including podcasts) and so forth. Processing such data may include storing the data in the memory 26 or memory of the card 20, executing applications to allow user interaction with data, displaying video and/or image content associated with the data, outputting audio sounds associated with the data and so forth.

With additional reference to FIG. 3, the mobile telephone 10 may be configured to operate as part of a communications system 60. The system 60 may include a communications network 62 having a server 64 (or servers) for managing calls placed by and destined to the mobile telephone 10, transmitting data to the mobile telephone 10 and carrying out any other support functions. The server communicates with the mobile telephone 10 via a transmission medium. The transmission medium may be any appropriate device or assembly, including, for example, a communications tower, another mobile telephone, a wireless access point, a satellite, etc. Portions of the network may include wireless transmission pathways. The network 62 may support the communications activity of multiple mobile telephones 10, although only one mobile telephone 10 is shown in the illustration of FIG. 3.

In one embodiment, the server 64 may operate in stand alone configuration relative to other servers of the network 62 or may be configured to carry out multiple communications network 62 functions. As will be appreciated, the server 64 may be configured as a typical computer system used to carry out server functions and may include a processor configured to execute software containing logical instructions that embody the functions of the server 64.

With additional reference to FIGS. 4, 5a and 5b, shown is the card reader 32. The card reader 32 has an open end 66 that provides access to a cavity 68 of the mobile telephone 10 that receives the card 20. The cavity 68 may be defined by walls 70. In one embodiment, the walls 70 can be integral with members that establish the housing 12. Inside the cavity 68 are moveable walls 72 that are positionable in response to the insertion of different form factor cards 20 that may be retained by the card reader 32. The moveable walls 72 may cooperate to urge the card 20 into a desired location within the cavity 68 to establish connection between a connector assembly 74 of the card reader 32 and contacts 76 of the card. In one embodiment, the connector assembly 74 may be urged toward the card 20 using, for example, a spring, resilient biasing member or the like.

In the illustrated example, the moveable walls 72 deflect from a natural position (e.g., when no card 20 is present) to accommodate the card 20 and apply a force to the card 20 to urge the card 20 towards a corner of the cavity 68. In this embodiment, coil springs 78 are connected to the moveable walls 72 to allow for the deflection and to apply counter force on the card 20. It will be appreciated that leaf springs may be used instead of the illustrated coil springs. In other embodiments, resilient biasing members, wedges, cams or other sliding and/or rotating mechanical assemblies may be used to position and/or retain the card.

In the illustrated embodiment, three moveable walls 72 are illustrated, including a side wall 72a, an end wall 72b and a bottom wall 72c. It will be appreciated that one or more of these walls 72 may be omitted or may be replaced by another moveable wall or positioner/retainer device. In addition, elongated detents or slots for cooperating with corresponding detents or slots of the card 20 may be provided as part of an appropriate wall(s) 70 or as part of an appropriate wall(s) 72.

A door 80 may be used to cover the opening 66. In the illustrated embodiment, the door 80 is hinged to the card reader 32 with a hinge 82. In other embodiments, the door 80 may be removably attached. In the illustrated embodiment, the door 80 includes a ridge 84 that engages an end of the card 20 to further assist in positioning the card 20. The door 80 may be held in a closed position with any appropriate latch or catch assembly (not shown). Thus, the door 80 functions as part of the retaining and positioning components of the card reader 32. In other embodiments, the door 80 may be omitted or the door may not assist in retaining or positioning the card 20. For example, an additional latch or catch may be used to secure the card 20 in a desired location once positioned by the walls 72. A card ejection assembly also may be provided to assist in removal of the card 20 from the cavity 68.

In FIG. 5a the card reader 32 is shown retaining a card 20 of a first form factor type. As indicated, removable media units come in many form factors. As used herein, media units (e.g., the illustrated cards 20) that have a different physical arrangement or a different electrical connector arrangement will be considered to have a different form factor. Only devices that have the same physical housing arrangement and/or electrical interface will be considered to have the same form factor for the for purposes of the description herein.

The exemplary card 20 of FIG. 5a is intended to schematically represent an M2 card available from Sony Corporation. The exemplary card 20' of FIG. 5b is intended to schematically represent a generic card that has a different form factor than the M2 card. The generic card is wider and shorter than the M2 card. Also, the generic card has fewer contacts 76 that the M2 card and the contacts of the generic card are positioned differently than the contacts of the M2 card.

Figure 6A:
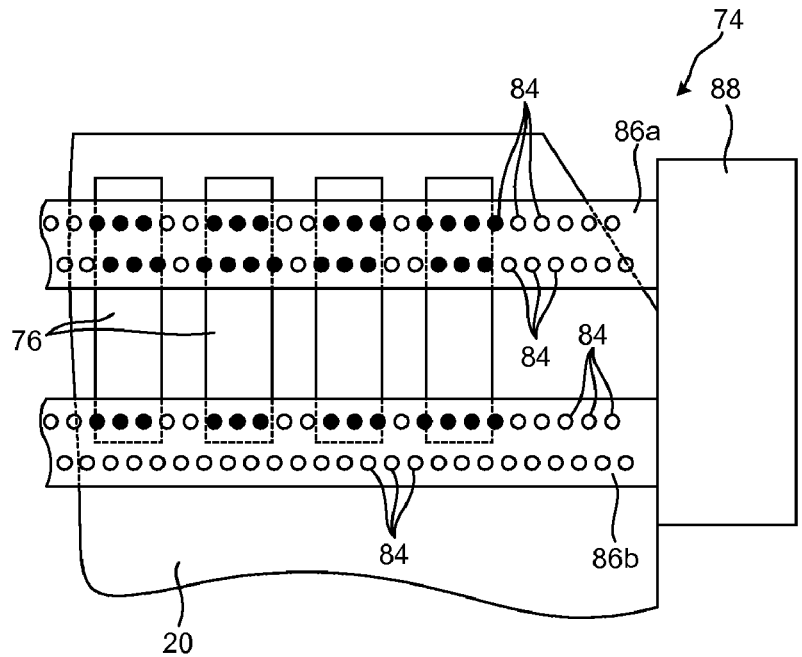
FIG. 6a is a partial top view of one embodiment of an electrical interface between the card reader of FIG. 4 and the card of the first form factor where contacts of the reader that make electrical contact with contacts of the card are highlighted.
Figure 6B:
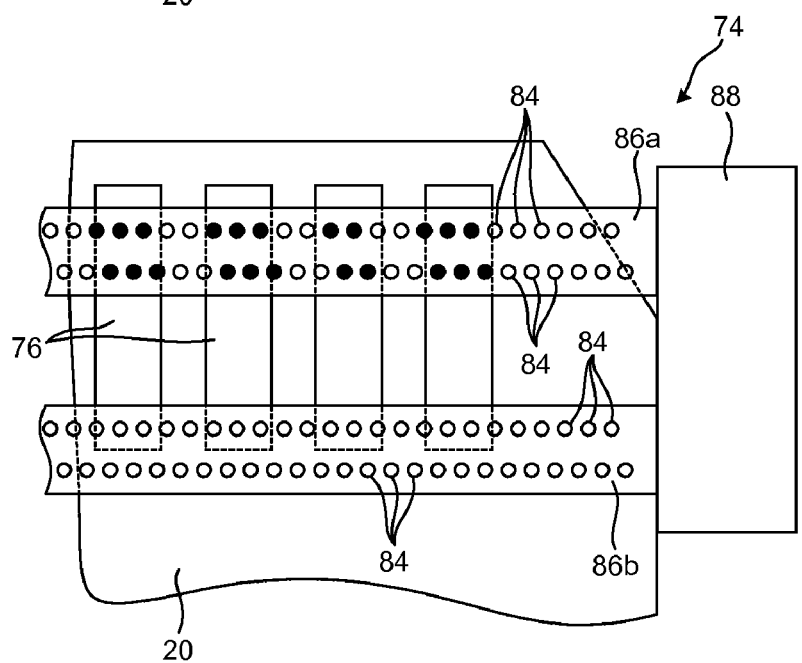
FIG. 6b is the same view as FIG. 6b, but where pairs of reader contacts that make electrical contact with contacts of the card as determined by a card analysis function are highlighted.

With additional reference to FIGS. 6a and 6b, one embodiment of the connector assembly 74 is shown. The connector assembly 74 establishes electrical connection from the mobile telephone 10 to the card 20. In addition, the connector assembly 74 is arranged so that the card analysis function (FIG. 2) may determine the type of card 20 that has been inserted into the card reader 32.

The connector assembly 74 includes plural contacts 84. In the embodiment of FIGS. 6a and 6b, the connector assembly 74 includes two "FG-S" or "FG-S fine" elastomeric connector strips 86a and 86b, which are available from Fujipoly under the brand name Zebra. Such connector strips 86 have anisotropic conduction properties and are constructed from thin conductors that are embedded in an insulating material (e.g., silicone rubber) in a vertical orientation relative to the device to be contacted. Thus, in the illustrated embodiment, each contact 84 corresponds to one or more conductors of the connector strips. The number of rows of conductors, offset between rows, conductor pitch and conductor cross-sectional size can be varied based on the types of cards 20 that one may desire to accept with the card reader 32. In the illustrated embodiment, there are two rows of contacts 84 per connector strip 86. Each row has the same number and pitch of contacts 84, but the rows are laterally offset from one another. Thus, the contacts 84 form an arrangement or pattern (e.g., matrix, series of offset rows, etc.) of electrical contact points.

In FIG. 6a, the card is the card 20 of FIG. 5a, which is intended to represent an M2 card. Furthermore, in FIG. 6a, each contact 84 that physically and/or electrically contacts a contact 76 of the card 20 is represented by a circle that is filled in (e.g., a black dot) and each contact 84 that does not physically or electrically contact a contact 76 of the card 20 is represented by a circle that is not filled in (e.g., a circle outline).

The specific contacts 84 that make such physical and/or electrical contact with contacts 76 of the card 20 will depend on the arrangement of the contacts 76 and the position of the card 20 within the card reader 32. Using information regarding which contacts 84 make physical and/or electrical connection with the contacts 76 may be used to determine the type of card 20 that is present in the card reader 32. The card analysis function 28 may be programmed to analyze the pattern of connection between contacts 84 and contacts 76 to determine the type of card 20. For instance, the pattern of connection between contacts 84 and contacts 76 may be compared against known card contact arrangements. Known card contact arrangements may be stored by the mobile telephone 10, such as by the memory 26.

In one embodiment, the contacts 84 are logically grouped in pairs. For purposes of the description herein each bottom row contact 84 is paired with the closest a top row contact 84, which in the illustrated example is off-center and to the left of the corresponding bottom row contact 84. The card analysis function 28 may be programmed to determine which pairs of contacts 84 have electrical continuity, which is established by both contacts 84 being in electrical connection with one of the contacts 76. If a pair of contacts 84 has continuity, those contacts 84 are considered to electrically connect to a single contact 76. If a pair of contacts 84 do not have continuity, one or both of the pair of contacts 84 are considered to not electrically connect to a single contact 76. In FIG. 6b, the pairs of contacts 84 that have continuity are represented by a circle that is filled in (e.g., a black dot) and each contact 84 that does not have continuity with a paired contact 84 is represented by a circle that is not filled in (e.g., a circle outline).

In one embodiment, a multichannel multiplexor 88 is controlled to establish the pairs of contacts 84. The card analysis function may analyze the pattern of contacts 84 have continuity to analyze the surface pattern of contacts 76 of the card. In some instances, the pattern of contacts 76 may be ascertained by running the continuity test on a single pairing arrangement of contacts 84. If the pattern of contacts 76 cannot be ascertained, a second pairing arrangement may be made. For instance, adjacent contacts 84 from the same row of contacts 84 may be paired by appropriate control of the multiplexor 88 and continuity checks between those pairs may be made. The data from the first and second pairings may be used to determine and/or further refine the pattern of contacts 76 of the card 20. Additional pairings and analysis may be made until the card type is determined.

Also, the analysis may determine which contacts 84 electrically connect to which contacts 76. From this information a map of the contacts 76 may be made. Once the card analysis function 28 determines which contacts 84 electrically connect to which contacts 76, this data may be used to establish operative connection to the card 20. For instance, the card analysis function 28 may control the multiplexor 88 to group the contacts 84 that connect to a single contact 76 so that electrical signals may be coupled to each contact 76 individually for operative interaction with the card 20. The card type determination and/or relative contact 84 to contact 76 information as determined by the card analysis function 28 may be passed to the card interface logic 30. Based on the card type, the card interface logic 30 may be used to communicate with the card 20. For example, the card interface logic may use standard protocols for the type of inserted card to interface with the card. Signals to or from a particular contact 76 of the card 20 are routed to the card 20 by appropriate contacts 84 of the connector assembly 74 using appropriate settings of the multiplexor 88.

Figure 7:
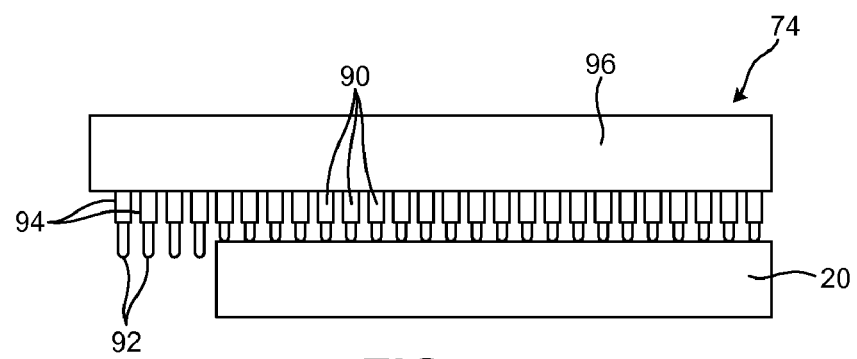
FIG. 7 is an end view of another embodiment of an electrical interface between the card reader of FIG. 4 and the card of the first form factor.

With additional reference to FIG. 7, other contact configurations are possible. In the exemplary embodiment of FIG. 7, contacts 90 that have changeable height (e.g., by linear deflection) are illustrated. Suitable pin type contacts 90 (or probes) are available from Everett Charles Technologies under the brand names Pogo, Mini-Mite and Bantam. Other suitable deflectable pin connectors are disclosed in U.S. Pat. No. 6,716,043, the disclosure of which is herein incorporated by reference in its entirety.

Deflectable pin contacts 90 typically have a conductive plunger 92 for making contact with a surface. The plunger 92 is retained by a barrel 94 and forced toward the surface by a spring (not shown). The spring for each contact 90 is typically disposed in the barrel 94, but in some configurations may be coiled around the barrel 94. In the illustrated example, plungers 92 that engage the card 20 are deflected into their respective barrels 94. Plungers 92 that do not engage the card 20 are left in their natural extended state. The contacts 90 may be arranged in offset rows, as a matrix or in any other appropriate configuration for the types of cards 20 that may be accepted by the card reader 32. The number, pitch and size of the contacts 90 also may be varied as desired. The contacts 90 may be retained by a harness 96.

The card analysis function 28 can determine the type of card 20 from conducting continuity testing using pairs of the contacts 90 in the same manner as described above for the contacts 84. In addition, a determination may be as to which contacts 90 operatively connect to which contacts 76 of the card 20 so that the card interface logic 30 and multiplexor 88 may be appropriately configured for the type of card 20 and the position of the card 20 in the reader 32.

Other suitable contacts include coil spring contacts arranged in a suitable pattern. Suitable coil spring contacts are disclosed in U.S. Pat. No. 6,666,690, the disclosure of which is herein incorporated by reference in its entirety, and are available from Yokowo Co., Ltd.

In one embodiment, card type and placement may be determined using sensing technology. For instance, micro-switches, position sensors and/or pressure sensors may be used in connection with the variable height pin contacts 90 and the card analysis function 28 to determine the size and/or placement of the card 20. In this embodiment, some contacts 90 may be used solely for size and/or placement data acquisition while other contacts 90 may be used for size and/or placement data acquisition as well as possible electrical connection to a contact 76 of the card 20. The contacts 90 used only for data acquisition need not be conductive and/or need not be electrically operative (e.g., not connected as part of the electrical interface from the card reader 32 to the card 20, such as through the multiplexor 88).

As another example, micro-switches, position sensors and/or pressure sensors may be used in connection with the variable position walls 72 (FIGS. 4, 5a and 5b) to determine the relative position of the walls 72. In yet another example, micro-switches, position sensors and/or pressure sensors may be arranged for engagement with the card 20 or other sensing of the card 20. In these embodiments, the switches and/or sensors may be used for size and/or placement data acquisition by the card analysis function 28.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A consumer electronic device, comprising:
 a media device reader configured to physically accept and electronically interface with plural form factor media devices, wherein the media device reader has a connector assembly having a pattern of contacts and each form factor media device has a different arrangement of electrical contacts; and
 a controller that determines a relationship of connector assembly contacts to the arrangement of contacts of a media device that is inserted into the media device reader, wherein to make the determination of the relationship the controller collects information regarding which connector assembly contacts make electrical connection with the media device contacts and analyzes the pattern of connection between connector assembly contacts and media device contacts to determine which form factor media device is inserted into the media device reader.

2. The consumer electronic device of claim 1, wherein the media devices are memory cards.

3. The consumer electronic device of claim 1, wherein the electronic device is a mobile radio terminal.

4. The consumer electronic device of claim 3, wherein the mobile radio terminal is a mobile telephone.

5. The consumer electronic device of claim 1, wherein the media device reader includes a positionable wall that moves between a first position to accept a media device having a first form factor and a second position to accept a media device having a second form factor.

6. The consumer electronic device of claim 5,
 wherein the positionable wall urges the inserted media device into a position to establish an electrical interface between contacts of the connector assembly and contacts of the inserted media device.

7. The consumer electronic device of claim 6, wherein the wall acts upon an edge of the inserted media device.

8. The consumer electronic device of claim 6, wherein the wall is biased with a spring.

9. The consumer electronic device of claim 6, wherein the media device includes a second positionable wall that moves between a first position to accept the media device having the first form factor and a second position to accept the media device having the second form factor, and the second positionable wall urges the inserted media device into a position to establish the electrical interface between contacts of the connector assembly and contacts of the inserted media device.

10. The consumer electronic device of claim 9, wherein one of the positionable walls acts upon an edge of the inserted media device and the other of the positionable walls acts upon a facial surface of the inserted media device.

11. The consumer electronic device of claim 1, wherein the media device reader includes a multiplexor that is controlled by the controller to operatively arrange the connector assembly contacts to interface with corresponding contacts of the inserted media device.

12. The consumer electronic device of claim 1, wherein the controller pairs the connector assembly contacts and probes for continuity between the contacts of the pairs, and where continuity, if present, is established by a contact of the inserted media device.

13. The consumer electronic device of claim 12, wherein the controller compares the location of contact pairs that have continuity with known media device contact patterns to determine the type of inserted media device.

14. The consumer electronic device of claim 12, wherein the media device reader includes a multiplexor that is controlled by the controller to establish the pairs of connector assembly contacts.

15. The consumer electronic device of claim 1, wherein the connector assembly contacts are arranged in a matrix.

16. The consumer electronic device of claim 1, wherein the connector assembly contacts are arranged in offset rows.

17. The consumer electronic device of claim 1, wherein the connector assembly includes an elastomeric connector strip having conductors embedded therein, the conductors forming the contact assembly contacts.

18. The consumer electronic device of claim 1, wherein the connector assembly contacts are changeable height pins.

19. The consumer electronic device of claim 1, wherein the media device is removable by a user of the electronic equipment.

20. The consumer electronic device of claim 1, wherein the controller adjusts media device interface logic to interface with the inserted media device in accordance with the determined relationship of connector assembly contacts to contacts of the inserted media device.

* * * * *